United States Patent [19]

Braun

[11] Patent Number: 5,137,127
[45] Date of Patent: Aug. 11, 1992

[54] MOTOR VEHICLE HILL HOLDER SYSTEM
[75] Inventor: Euguene R. Braun, Royal Oak, Mich.
[73] Assignee: Eaton Corporation, Cleveland, Ohio
[21] Appl. No.: 679,989
[22] Filed: Apr. 3, 1991
[51] Int. Cl.$^5$ ............................................. B60K 41/20
[52] U.S. Cl. .................................. 192/1.32; 192/1.33
[58] Field of Search .............................. 192/1.32, 1.33

[56] References Cited

U.S. PATENT DOCUMENTS

| | | | |
|---|---|---|---|
| 3,677,609 | 7/1972 | Davis et al. | 303/105 |
| 3,740,104 | 6/1973 | Wolf | 303/98 |
| 3,768,875 | 10/1973 | Davis et al. | 303/119 SV |
| 4,061,404 | 12/1977 | Lantz | 303/118 |
| 4,497,395 | 2/1985 | Nogami et al. | 192/1.32 X |
| 4,519,273 | 5/1985 | Shimizu et al. | 192/1.36 X |
| 4,582,184 | 4/1986 | Taig et al. | 192/1.31 X |
| 4,650,046 | 3/1987 | Parsons | 192/4 A X |
| 4,676,354 | 6/1987 | Janiszewski et al. | 192/1.31 X |
| 4,708,406 | 11/1987 | Takagi et al. | 192/1.33 X |
| 4,865,175 | 9/1989 | Hirako et al. | 192/1.33 X |
| 4,867,291 | 9/1989 | Holman et al. | 192/4 A |
| 5,015,046 | 5/1991 | Bissell | 303/118 |

Primary Examiner—Leslie A. Braun
Assistant Examiner—Nicholas Whitelan
Attorney, Agent, or Firm—A. E. Chrow

[57] ABSTRACT

Provided is a hill holder system operative to prevent a vehicle such as a truck having a fluid operated brake system from rolling backward down an incline or to assist an operator in braking when descending an incline. The system utilizes a control signal (C) provided by a central processing unit (10) operative to instruct a brake control valve (22) to close the brake balve exhaust port(s) (27) to maintain the brakes in an engaged condition whenever a selected speed condition such as vehicle ground speed is below a predetermined value. In other embodiments, selected vehicle drive train conditions such as either or both throttle and clutch position are processed in combination with the selected speed signal to effect braking in the manner desired.

11 Claims, 2 Drawing Sheets

MOTOR VEHICLE HILL HOLDER SYSTEM

INTRODUCTION

This invention relates generally to a motor vehicle hill holder system and more particularly to a system that in one embodiment is operative to maintain the motor vehicle brakes in an engaged condition so long as a selected speed condition such as vehicle land speed is below a predetermined value and in another embodiment combines the selected speed condition with one or more drive train conditions such as throttle and clutch positions to control actuation of the brakes. This invention is partially described and may be used in conjunction with my copending application Ser. No. 600,657 filed Oct. 22, 1990 and entitled "Automatic Mechanical Transmission Start Control System".

BACKGROUND OF THE INVENTION

A variety of hill holder systems have been proposed in the past to automatically brake a vehicle descending a hill or to prevent a vehicle from rolling backwards while ascending a hill when the vehicle is traveling below some predetermined minimum speed value.

Such can be of particular advantage to the vehicle driver in instances where the vehicle is a truck carrying a heavy load.

One example of a motor vehicle hill holding system is disclosed in U.S. Pat. No. 4,582,184, the disclosure of which is incorporated herein by reference. The device disclosed in this patent is operative to maintain the brakes in an engaged condition when the clutch pedal is depressed and the vehicle comes to a stop on an incline by means of a linkage connection between the clutch and brake pedal.

Another example of a motor vehicle is disclosed in U.S. Pat. No. 4,650,046, the disclosure of which is incorporated herein by reference. In this patent, the hill holder device includes a undirectional sprag clutch that, when actuated, permits the drive shaft to rotate in only one direction thus preventing it from rotating in an opposite direction in the event that the vehicle begins to roll backwards down an incline.

Yet another example of a motor vehicle hill holding system is disclosed in U.S. Pat. No. 4,867,291, the disclosure of which is incorporated herein by reference. Here, a sprag clutch is employed to limit transmission countershaft rotation to only one direction which again operates to prevent the vehicle from rolling in the opposite direction as previously described.

Although the above described devices may be used to advantage they all employ complicated clutch or linkage mechanisms that are expensive to install and maintain.

In contrast to the above described prior art, the present invention employs a relatively simple fluid control valve arrangement that is responsive to a control signal derived from a selected speed condition signal alone or in combination with a selected drive train condition such as a throttle position and/or clutch position so as to cause the brakes to automatically engage when the control signal is below a predetermined value.

SUMMARY OF THE INVENTION

Accordingly, it is an object of this invention to provide a motor vehicle hill holder system.

It is another object of this invention to provide a motor vehicle hill holder system that is simple in operation and inexpensive to install and to maintain.

It is yet another object of this invention to provide a motor vehicle hill holder system that is operative to maintain the brakes in an engaged condition in response to a control signal derived from a selected speed condition signal or from a combination of the speed condition signal and a selected drive train condition such as throttle position and/or clutch position.

DESCRIPTION OF SOME PREFERRED EMBODIMENT

Figure 1:
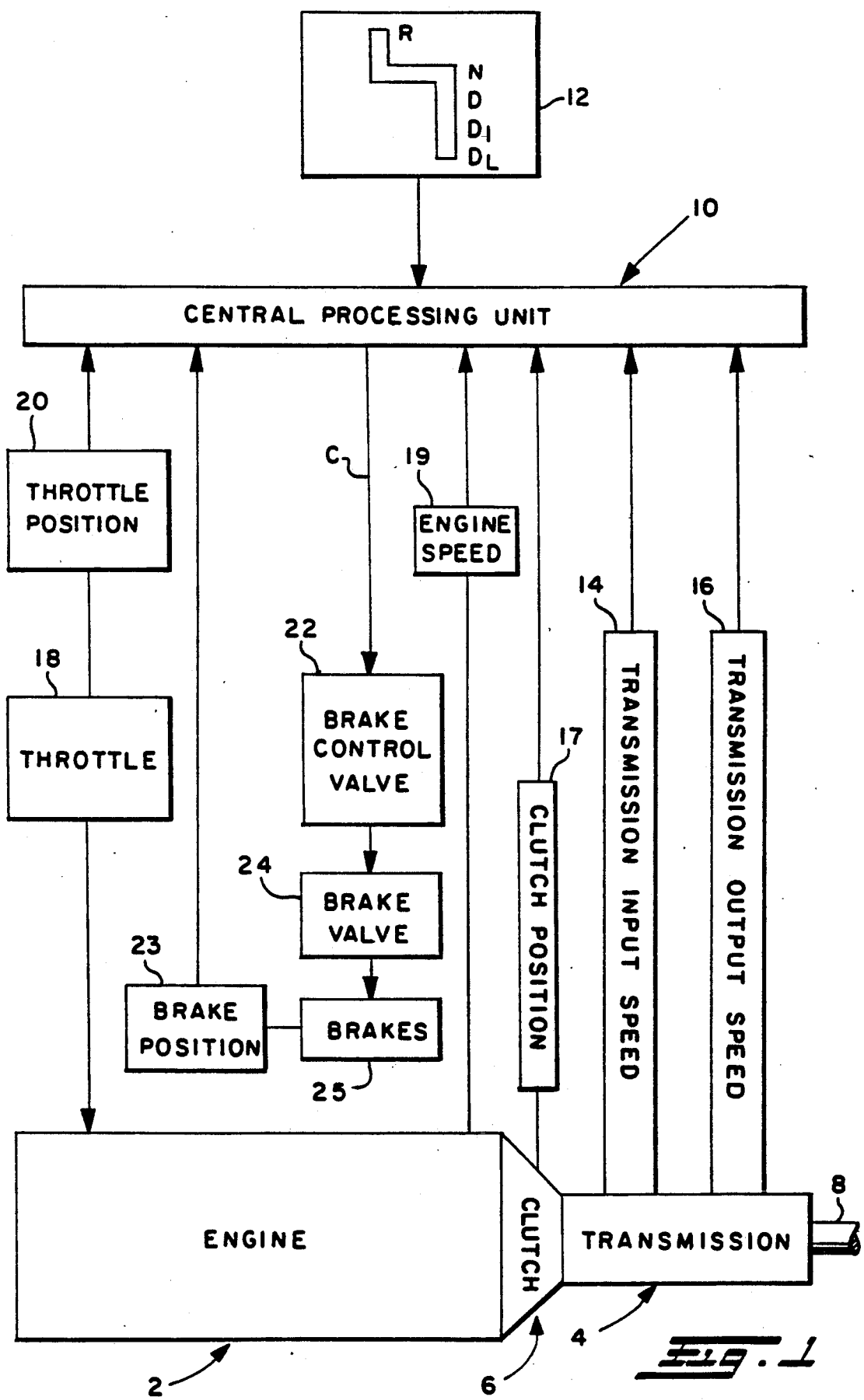
FIG. 1 is a block diagram of an embodiment of the motor vehicle hill holder system of the invention.

In FIG. 1, an embodiment of the hill holder system is applied to a motor vehicle driven by an internal combustion engine 2. The speed of engine 2 is controlled by a throttle 18 whose position is sensed by sensor 20. Engine 2 is operatively connected to the vehicle's transmission 4 by clutch 6. Engine 2 is operative to rotate drive shaft 8 when clutched to transmission 4 and the rotary speed and direction of shaft 8 is governed by the gear combinations selected by selector 12.

The hill holder system of the invention includes at least one speed sensor operative to sense and provide a signal indicative of a selected speed condition such as one or more of ground speed, engine speed, change in ground speed, and change in engine speed. Ground speed can be deduced for example from either transmission input speed sensor 14 or a transmission output speed sensor 16 and engine speed can for example, be sensed by monitoring the main drive shaft RPM such as by engine speed sensor 19 diagrammatrically shown in FIG. 1.

The hill holder system of the invention preferably includes a brake position sensor such as referenced by numeral 23 in FIG. 1 that is operative to provide a signal indicating whether the vehicle brakes 25 are in an engaged or disengaged condition.

The hill holder system of the invention also preferably includes a clutch position sensor 17 operative to provide a clutch position signal indicating whether the clutch is in an engaged or disengaged condition.

Brakes 25 are operated by pressurized fluid such as air or a suitable liquid brake fluid that is conveyed under pressure from brake valve 24 to respective wheel brake cylinders (not shown) that are mechanically linked to the brakes and operative to move the brakes into engagement when pressurized as is well known to those skilled in the art of vehicle brake design.

Figure 2:
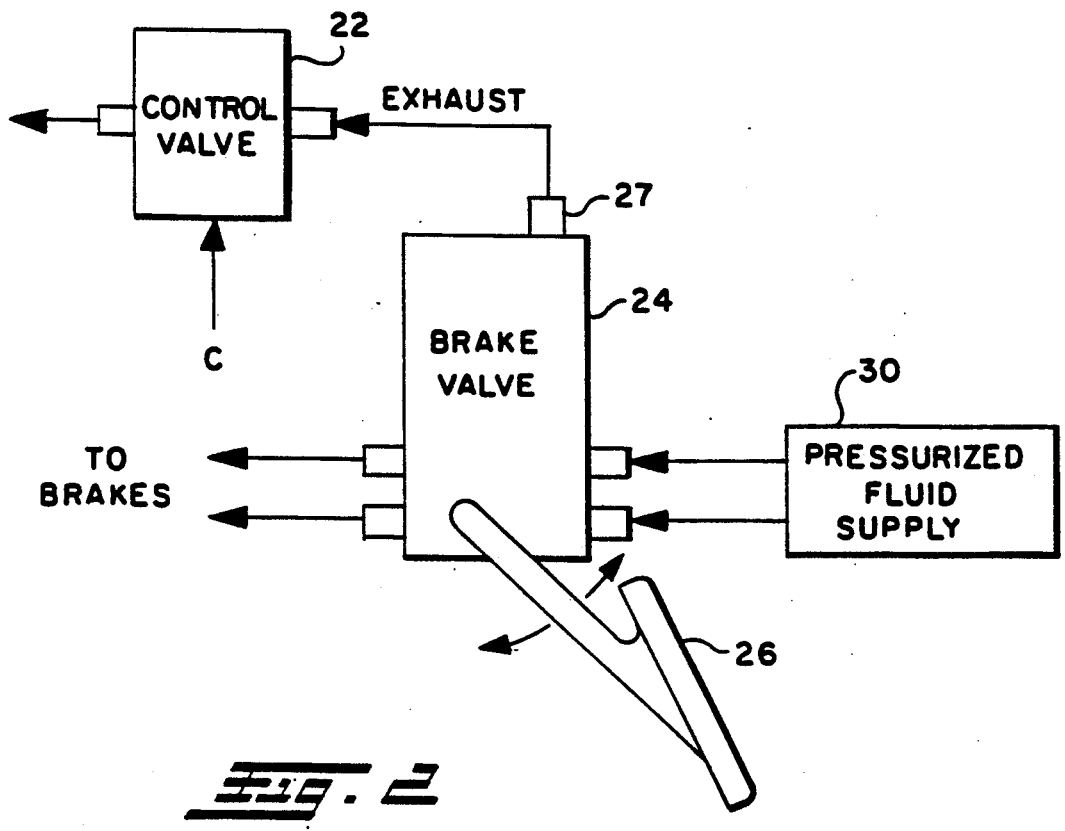
FIG. 2 is a block diagram showing an embodiment of a control valve for use in connection with the vehicle hill holder system of the invention.
Figure 3:
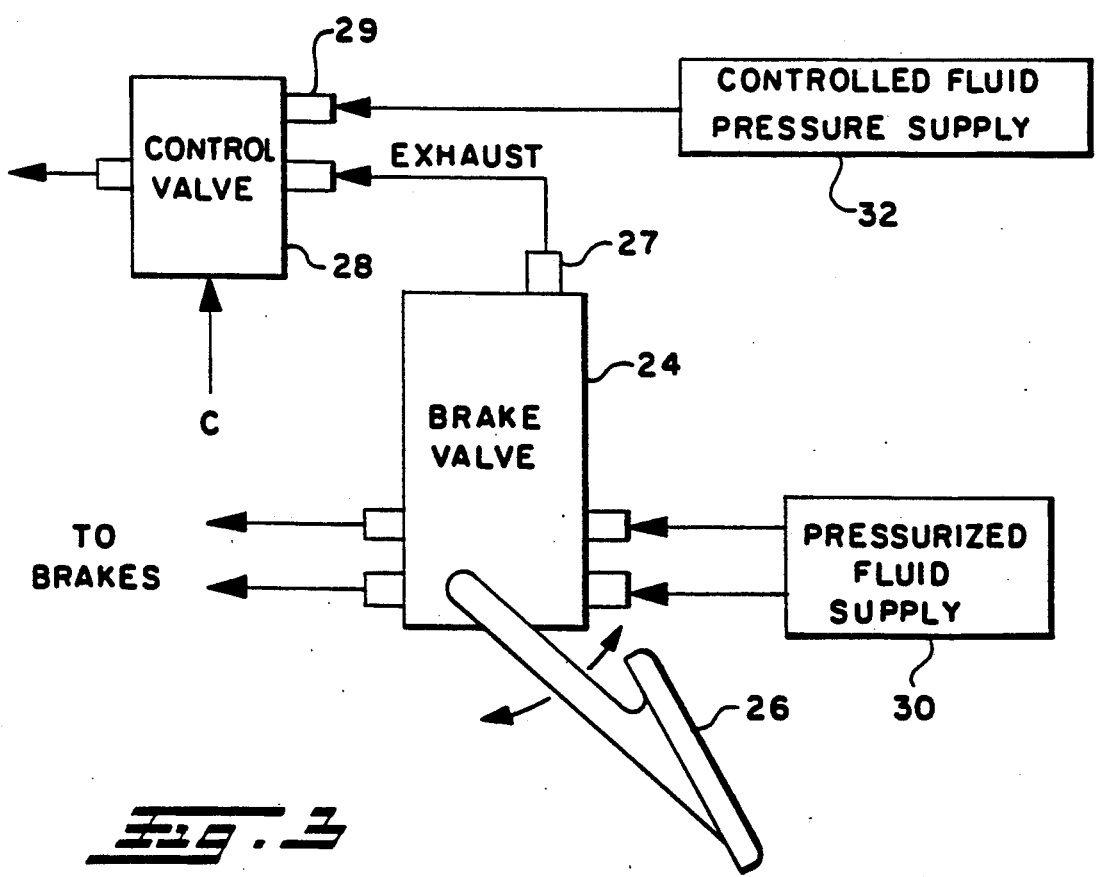
FIG. 3 is a block diagram showing another embodiment of a control valve for use in the hill holder system of the invention.

As shown in FIGS. 2 and 3, brake valve 24 has at least one exhaust port 27 that is normally closed when the brakes are engaged and normally open when the brakes are disengaged. Brake valve 24 receives pressurized fluid from a pressurized fluid supply 30 and is operative to enable the pressurized fluid to be delivered to the brake cylinders when pedal 26 is pressed in a clockwise direction as viewed in FIGS. 2 and 3 whilst exhaust port 27 is closed. When brake pedal 26 is released, exhaust port 27 opens to enable fluid pressure to decrease to ambient which in turn decreases pressure in the wheel brake cylinders to ambient enabling release of the brakes characteristically by return spring action, as is well known to those skilled in the art of vehicle wheel brake design.

In FIG. 2, the system of the present invention employs a control valve 22 that is operatively connected to exhaust port 27 and is operative to control whether pressurized fluid is able to exhaust from port 27 in response to a control signal "C" hereinafter described.

Control signal C is an output signal provided by control processing unit 10 shown in FIG. 1. Control signal C is preferably an electrical signal that is delivered to brake control valve 22. Control signal C is a signal that in one embodiment of the invention is a function of speed derived from a selected speed condition such as vehicle ground speed from either transmission input speed 14 or transmission output speed 16 as previously described. When control signal C is based upon a ground speed it may also be derived from other sources on the vehicle that in one way or another or correlatable to ground speed such as directly from the speedometer itself or from tire RPM.

The speed condition signal can be sensed from a change in ground and/or engine speed as well as from ground and/or engine speed where such is desired. A change in ground speed and/or engine RPM is characteristically indicative of increased load while undergoing acceleration which the system of the invention can then employ to automatically release the brakes while undergoing an acceleration and vice versa while undergoing a deceleration so as to automatically apply the brakes when the selected speed signal is below the predetermined value.

Brake control valve 22 is preferably an electrical solenoid actuated valve that receives control signal C and is operative to close exhaust port 27 of valve 24 when, for example, the vehicle speed is below a predetermined value such as 3 miles per hour. Brake valve 24 receives pressurized fluid from supply 30 and, while exhaust port 27 remains closed, pressure is unable to bleed off of the brake cylinders and the brakes remain in the engaged condition regardless of whether the operator releases foot pedal 26 shown in FIGS. 2 and 3.

When, for example, vehicle ground speed is greater than a predetermined value, control signal C instructs control valve 22 to open exhaust port 27 enabling pressure to bleed from the brake cylinders causing the brakes to release enabling the operator to accelerate by depressing or actuating the throttle which itself can be used to advantage as shown in FIG. 1, where a throttle position sensor 20 is employed to provide processing unit 10 with information concerning the position of throttle 18 in combination with a selected speed condition alone and/or in combination with clutch position as previously described. When throttle 18 is pressed by an operator, unit 10 processes the information in combination with the selected speed condition and sends a control signal C instructing control valve 22 to open so as to enable pressure bleed off from brake valve 24 for release of brake 25.

When the hill holder system of the invention includes a change in one or more selected drive train conditions, such as clutch and or throttle positions, in combination with the selected speed condition signal as information to be processed by information processing unit (10), the system is then effective such that control signal C is operative to instruct control valve 22 to open exhaust port 27 of brake valve 24 to disengage the brakes when the speed condition signal has increased sufficiently to reach the predetermined value such as when the throttle is advanced or the clutch is engaged while the speed signal is below the predetermined value.

FIG. 3 shows a variation of the system of the invention in which a control valve 28 is operative to receive control signal C and close exhaust port 27 of brake valve 24 when, for example, vehicle ground speed is below a predetermined value so as to keep the brakes engaged as previously described. Control valve 28 differs from control valve 22 of FIG. 2 in that it includes an additional input port 29 connected to a controlled fluid pressure supply source 32. Control signal C is operative to effect fluid communication between valve 28 and source 32 to enable valve 28 to receive controlled fluid pressure from fluid supply 32 and to control the rate at which control valve 28 is able to open exhaust port 27 of brake valve 24. For example control valve 28 may be operative to drive a piston or the like to open and close a port that in turn enables exhaust to pass from exhaust port 27 or stop it, as the case may be. Fluid supply 32 may, for example, be is exposed to the opposite side of the cylinder head and operate to control the rate at which the exhaust port is opened which in turn controls the rate at which the brakes are released.

Thus, many variations of selected speed conditions alone or in combination with selected drive train conditions such as either or both throttle and clutch position may be used to provide desired information for processing by the control processing unit to provide the output signal C for operating the brakes under hill holding circumstances. Thus, for example, control signal C can be used to open the brake valve exhaust port to enable manual braking on operator when the selected speed condition signal is above a predetermined value. Likewise, control signal C may be employed to change a condition of the exhaust port such as hereinbefore described with respect to FIG. 3 so that the brakes are maintained in a engaged condition, including the level of engagement, so long as the speed signal remains below the predetermined value. Even further, control signal C is operative to open the exhaust port to disengage the brakes when the speed signal has increased sufficiently to reach the predetermined value.

In addition to the above, drive train conditions such as throttle position and/or clutch position signals may be processed in combination with the speed condition signal to effect engagement or disengagement of the brakes in the manner desired such as where the brakes are caused to disengage when the throttle is advanced and or the clutch is engaged even through the speed condition signal is below the predetermined value.

Thus, the system of the invention employs a control valve responsive to a control signal that is operative to open and close the brake valve exhaust port(s) (may be more than one) according to whether the selected speed condition is above or below a predetermined value. Once below that value, the control valve operates to close the brake exhaust port(s) and maintain the brakes in an engaged condition to prevent the vehicle from rolling backward down an incline or to automatically brake the vehicle when descending an incline. In addition, combinations of selected drive train conditions such as throttle and clutch position may be processed with the selected speed condition signal to effect braking in the manner desired and the hill holder system of the invention does not in any manner prevent an operator from pressing on the brakes at anytime to override the system when desired.

What is claimed is:

1. A motor vehicle hill holder system, said system including a first sensor operative to provide a speed signal indicative of a selected speed condition, pressurized fluid brake apparatus employing at least one valve member having an exhaust port that is normally closed when the brakes are in an engaged condition and normally open when the brakes are in a disengaged condition, and information processing unit operative to receive at least said speed signal and provide an output control signal as a function thereof, said system including an exhaust port control valve operative to receive the control signal and (i) open the exhaust port to enable manual braking by an operator when the speed signal is above a predetermined value; and (ii) change a condition of the exhaust port so that the brakes are maintained in an engaged condition so long as the speed signal remains below the predetermined value.

2. The system of claim 1 further including at least one additional sensor operative to provide a position signal indicative of at least one selected drive train condition and the control signal is a function of the selected speed condition signal and the selected drive train condition signal for receipt by the control valve for operation of the brake valve exhaust port.

3. The system of claim 2 wherein the control signal is operative to cause the exhaust port control valve to open the exhaust port to disengage the brakes when the speed signal has increased sufficiently to reach the predetermined value.

4. The system of claim 2 wherein the vehicle has a throttle controlled engine and the drive train condition is the throttle position.

5. The system of claim 2 wherein the vehicle has a master clutch connecting the motor to a transmission and the drive train condition is the clutch position.

6. The system of claim 1 or 2 wherein the speed condition is selected from one or more of ground speed, engine speed change in ground speed, and change in engine speed.

7. The system of claim 2 wherein the vehicle has a throttle controlled engine and a master clutch connecting to the engine to a transmission and the control signal is a function of the selected speed condition signal, the throttle position signal, and the clutch position signal.

8. The system of claim 1 or 3 wherein the exhaust port control valve is operative to open the exhaust port at a controlled rate.

9. The system of claim 1 or 3 wherein the control signal is operative to open the exhaust port at a controlled rate.

10. The system of claim 1 wherein the change in the exhaust port condition is to close the exhaust port.

11. The system of claim 1 wherein the change in the exhaust port condition is provided by establishing fluid communication between the exhaust port and a controlled fluid pressure source operative to enable the valve member to control the engagement level at which the brakes are maintained.

* * * * *